United States Patent Office 2,882,291
Patented Apr. 14, 1959

2,882,291
HALOALKENYL ESTERS OF MONO-SUBSTITUTED DITHIOCARBAMIC ACIDS

Marion W. Harman, Nitro, and Harry W. Kilbourne, South Charleston, W. Va., assignors to Monsanto Chemical Company, St. Louis, Mo., a corporation of Delaware No Drawing. Application November 9, 1955
Serial No. 546,002

11 Claims. (Cl. 260—455)

The present invention relates to haloalkenyl esters of mono-substituted dithiocarbamic acids. The new compounds comprise the structure R—NH—CSS—R' where R is an acyclic radical in which the carbon chain contains less than 4 carbon atoms in an uninterrupted chain and R' represents a halogen substituted alkenyl group containing less than 5 carbon atoms. An especially active and therefore preferred class comprise the structure

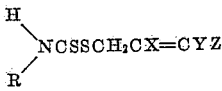

where R has the same significance as before, X and Y are hydrogen or halogen, at least one of which is halogen, and Z is methyl or hydrogen.

The compounds of this invention may be prepared by condensing a water soluble alkali metal salt of a mono-substituted dithiocarbamate with a haloolefin. Examples of the new compound are represented by the 3-chloro-2-butenyl, 2-chloroallyl and cis- and trans-2,3-dichloro-allyl esters of the following mono-substituted dithiocarbamic acids; methyl-, ethyl-, butyl-, isobutyl-, sec-butyl-, propyl-, isopropyl-, allyl- and 2-vinyloxy ethyl dithiocarbamic acids.

The following examples illustrate in detail the preparation and properties of some of the new products but are not to be taken as limitative.

Example 1

To 20 grams of sodium hydroxide dissolved in 250 ml. of water was added 30 grams (0.5 mole) of isopropylamine and the flask cooled in crushed ice. To this solution there was added dropwise over a period of 2 hours 38 grams (0.5 mole) of carbon disulfide while maintaining the temperature below 10° C. The mixture was then stirred until clear (requiring approximately 2 hours), and 62.5 grams (0.5 mole) of 1,3-dichloro-2-butene added, causing a temperature rise to 38° C. After stirring for 12 hours, the product was separated, washed with water and dried at 75° C. under 1 mm. of mercury for 6 hours. The 3-chloro-2-butenyl isopropyldithiocarbamate so obtained analyzed 6.19% nitrogen, 27.9% sulfur and 16.2% chlorine as compared to 6.30% nitrogen, 28.8% sulfur and 15.7% chlorine calculated for $C_8H_{14}ClNS_2$.

Example 2

To a stirred solution containing 62 grams (0.5 mole) of 25% methylamine, 80 grams (0.5 mole) of 25% sodium hydroxide and 125 grams of water was added at 15–20° C. over a period of 25 minutes 38 grams (0.5 mole) of carbon disulfide and stirring continued for an additional hour. The 72.7 grams (0.5 mole) of cis- and trans-1,2,3-trichloropropene was added and the mixture heated with stirring at 50–60° C. for 5 hours. Upon cooling the product separated and the lower layer was washed neutral with water and dried at 100° C./1 mm. The cis- and trans-2,3-dichloroallyl methyldithiocarbamate so obtained was a dark amber oil very soluble in acetone, benzene, chloroform, ethyl alcohol and ethyl acetate, slightly soluble in ether and insoluble in heptane and water. Analysis gave 6.17% nitrogen compared to 6.48% calculated for $C_5H_7Cl_2NS_2$.

Example 3

In the procedure of Example 2, isopropylamine was substituted for the 25% methylamine and the product isolated as described. The cis-and trans-2,3-dichloroallyl isopropyldithiocarbamate so obtained was an amber liquid very soluble in ether, acetone, benzene, chloroform, ethyl alcohol, ethyl acetate and hot heptane but insoluble in water. Analysis gave 5.36% nitrogen as compared to 5.73% calculated for $C_7H_{11}Cl_2NS_2$.

Example 4

To 160 grams (1 mole) of 25% sodium hydroxide dissolved in 300 grams of water was added 59.1 grams (1 mole) of isopropylamine, keeping the mixture cold by means of an ice bath. Next there were added 76 grams (1 mole) of carbon disulfide, the ice-bath removed and the product stirred for 30 minutes whereupon 111 grams (1 mole) of 2,3-dichloropropene was added all at once with no appreciable temperature rise. The product was then heated at 50–60° C. for 5 hours, cooled, washed neutral with water and dried in vacuo at 100° C./4 mm. The 2-chloroallyl N-isopropyldithiocarbamate so obtained was an amber oil analyzing 6.79% nitrogen, 29.42% sulfur and 16.89% chlorine compared to 6.68% nitrogen, 30.57% sulfur and 16.90% chlorine calculated for $C_7H_{12}ClNS_2$.

By a similar procedure, substituting the appropriate amines, the following new compounds were prepared:

| Example No. | Structural Formula | Physical Properties | Analysis, percent Calcd. | Analysis, percent Found |
|---|---|---|---|---|
| 5 | $CH_3NHCSSCH_2CCl=CH_2$ | Amber oil | N—7.71<br>S—35.29<br>Cl—19.51 | 7.24<br>33.25<br>22.00 |
| 6 | $(CH_3)_2CHOCH_2CH_2CH_2NHCSSCH_2CCl=CH_2$ | Amber liquid | N—5.23<br>S—23.94<br>Cl—13.24 | 5.37<br>22.41<br>13.56 |
| 7 | $CN_3OCH_2CH_2CH_2NHCSSCH_2CCl=CH_2$ | do | N—5.84<br>S—26.74<br>Cl—14.79 | 5.98<br>24.69<br>15.88 |
| 8 | $(CH_3)_2NCH_2CH_2CH_2NHCSSCH_2CCl=CH_2$ | Red liquid | N—11.08<br>S—25.36<br>Cl—14.02 | 10.71<br>23.37<br>15.96 |
| 9 | $CH_3OCH_2CH_2NHCSSCH_2CCl=CH_2$ | Dark amber liquid | N—6.20<br>Cl—15.70 | 5.75<br>16.96 |
| 10 | $CH_2=CHCH_2NHCSSCH_2CCl=CH_2$ | Red liquid | N—6.74<br>S—30.87<br>Cl—17.07 | 6.85<br>31.66<br>17.76 |
| 11 | $C_2H_5NHCSSCH_2CCl=CH_2$ | Yellow oil | N—7.16<br>S—32.76<br>Cl—18.11 | 7.18<br>31.56<br>19.98 |

Example 12

To a stirred solution containing 43.5 grams (0.5 mole) of 2-vinyloxyethylamine, 80 grams (0.5 mole) of 25% sodium hydroxide and 150 grams of water was added 38 grams (0.5 mole) of carbon disulfide. The mixture was stirred for one-half hour and the ice-bath removed. Then 55.5 grams (0.5 mole) of 2,3-dichloropropene was added in one portion and the mixture stirred and heated at 50–60° C. for 5 hours. The product was then cooled, extracted with ether and the ether layer washed with water until neutral. The solvent was removed by evaporation at 100° C./5 mm. The 2-chloroallyl N-2-vinyloxy ethyldithiocarbamate was obtained as a red oil. Analysis gave 6.00% nitrogen, 25.95% sulfur and 14.69% chlorine as compared to 5.89% nitrogen, 26.97% sulfur and 14.91% chlorine calculated for $C_8H_{12}ClNOS_2$.

The new compounds are particularly useful for the control of nematodes and as soil fumigants. They also comprise compounds useful as industrial preservatives and as herbicides.

It is intended to cover all changes and modifications of the examples of the invention herein chosen for purposes of disclosure which do not constitute departures from the spirit and scope of the invention.

What is claimed is:

1. A compound of the structure

R—NH—CSS—R' where R is an acyclic radical in which the carbon to carbon valences are not greater than two selected from the group consisting of alkyl radicals containing less than 4 carbon atoms, alkenyl radicals containing less than 4 carbon atoms and substituted derivatives thereof wherein the substitutents are selected from the group consisting of lower alkenoxy, lower alkoxy and lower alkylamino and R' represents a halogen substituted alkenyl group containing less than 5 carbon atoms in which the carbon to carbon valences are not greater than two, one double bond being present.

2. A compound of the structure

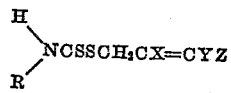

where R is an acyclic radical containing less than 4 carbon atoms in which the carbon to carbon valences are not greater than two, but more than one double bond being present, X and Y are selected from a group consisting of hydrogen and halogen, at least one of which is halogen, and Z is selected from a group consisting of methyl and hydrogen.

3. A compound of the structure

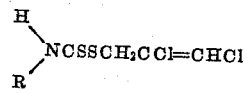

where R is an alkyl group containing less than 4 carbon atoms.

4. A compound of the structure

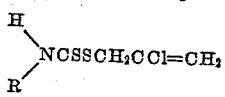

where R is an alkyl group containing less than 4 carbon atoms.

5. The compound of the structure

$CH_3NHCSSCH_2CCl=CHCl$

6. The compound of the structure

$C_2H_5NHCSSCH_2CCl=CH_2$

7. The compound of the structure

$CH_3NHCSSCH_2CCl=CH_2$

8. The compound of the structure

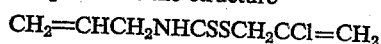

$CH_2=CHCH_2NHCSSCH_2CCl=CH_2$

9. The compound of the structure

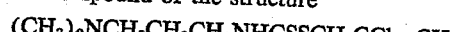

$(CH_3)_2NCH_2CH_2CH_2NHCSSCH_2CCl=CH_2$

10. The compound of the structure

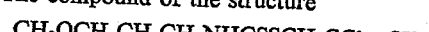

$CH_3OCH_2CH_2CH_2NHCSSCH_2CCl=CH_2$

11. The compound of the structure

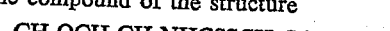

$CH_3OCH_2CH_2NHCSSCH_2CCl=CH_2$

References Cited in the file of this patent

UNITED STATES PATENTS 2,744,898  Harman et al. _ _ _ _ _ _ _ _ _ _ _ May 8, 1956

OTHER REFERENCES

Harman et al.: Journal American Chemical Society, vol. 75, August 20, 1953, pp. 4081–2.